Jan. 7, 1969 P. N. JOCHIM 3,420,380
FILING DEVICE HAVING POCKETS FORMED BY STEPPED SLIPS
Filed Sept. 9, 1966
Sheet 1 of 2
FIG. 1.
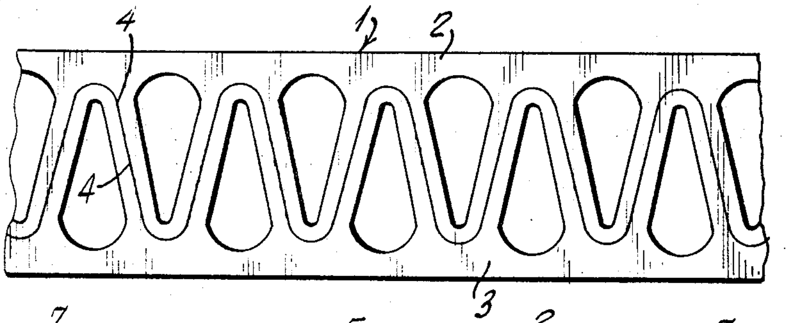
FIG. 2.
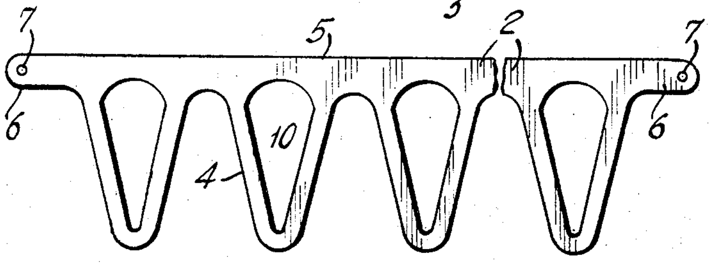
FIG. 7.
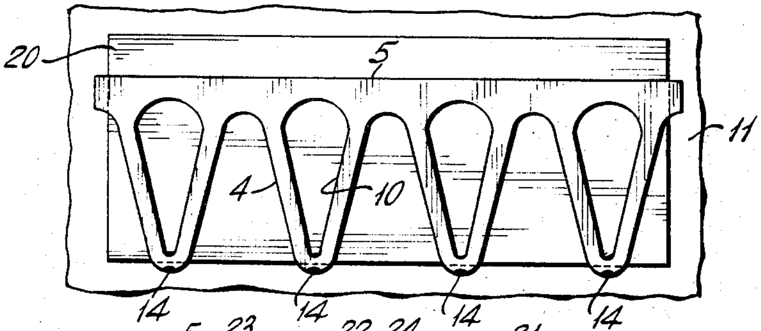
FIG. 8.
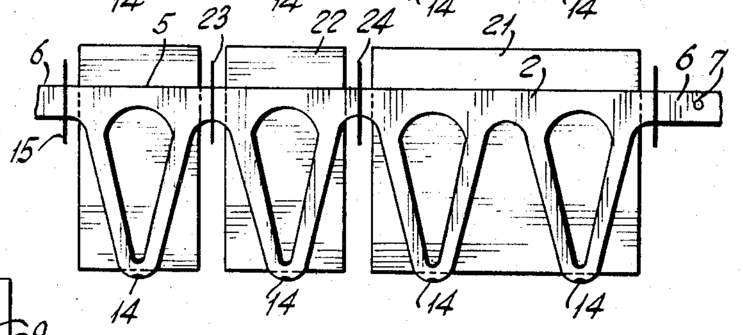
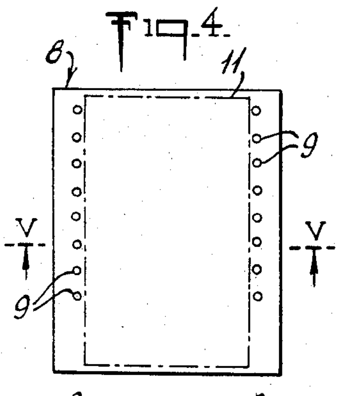
FIG. 6.
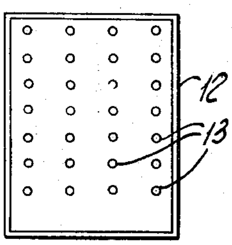
FIG. 5.
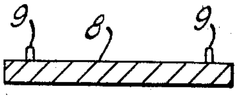
INVENTOR
PAUL N. JOCHIM
BY KARL RATH
ATTORNEY

INVENTOR
PAUL N. JOCHIM
BY
KARL RATH
ATTORNEY

United States Patent Office 3,420,380

Patented Jan. 7, 1969

3,420,380

FILING DEVICE HAVING POCKETS FORMED BY STEPPED SLIPS

Paul N. Jochim, 17 Rue du Neufeld, 67 Strasbourg-Neudorf, Bas-Rhin, France

Filed Sept. 9, 1966, Ser. No. 578,260
Claims priority, application France, Sept. 17, 1965, 31,708
U.S. Cl. 211—10 5 Claims
Int. Cl. B42f 17/04

ABSTRACT OF THE DISCLOSURE

In a file or classifier of the type composed of stepped superposed slips having their lower edges secured to a panel, to provide a multiple-pocket file for the storing of cards, sheets or the like objects, the slips are provided with spaced oblong vertical apertures being aligned in the assembled position of the slips, the spacing distances between both the upper and lower short edges of said apertures from the adjoining upper and lower edges of the slips being less than the "pitch" distance between adjacent edges of the stepped slips, whereby to provide rows of freely accessible fractional areas of and adjoining the lower edges of the slips in direct contact with said panel. A main advantage of such a file is the possibility of securing all the slips to said panel, preferably by spot welding, in a single operation and by means of a multiple welding tool.

Figure 3:
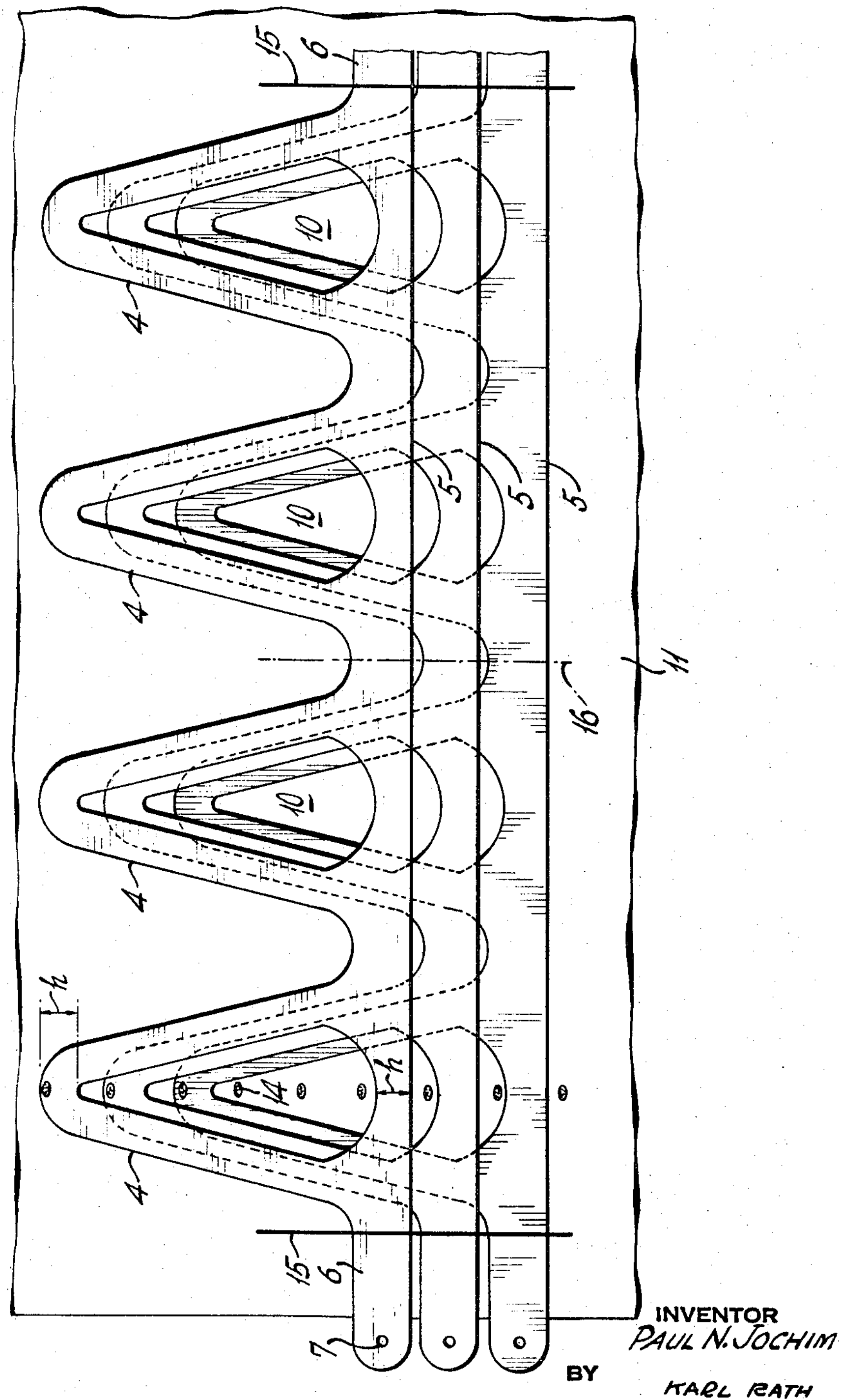

The present invention relates to stepped-slip multiple-pocket filing devices or classifiers for the sorting and filing of documents, such as sheets, cards, and the like flat objects.

In order to file punched cards and other analogous objects vertically on a panel, board, rack or the like, in clearly apparent manner, and so that the upper portion of each filing pocket projects above the immediately adjacent pocket to a required distance, it is already known that one or both sides of rigid panels, or of pliable or flexible sheets may be provided, for example, with stepped horizontal slips or strips of plastic material, which partially overlap and whose height is chosen as a function of that of the cards or the like objects to be filed. The vertical distances between the adjacent horizontal edges of the strips, representing the "pitch" distance required, determine the height by which the files project.

In view of the fact that the height of the files, in the vast majority of cases, is a multiple of the desired height of its projection, each strip perforce covers several of the welding seams or lines at the lower edges of the strips, so that each strip must be welded individually. After each welding action, the supporting board or sheet is displaced by the height of the "pitch," then stopped again for welding or bonding the next strip.

Such a production method naturally entails a considerable increase in cost price. The filing or sorting panels or boards thus manufactured have another disadvantage. Owing to the fact that the strips overlap, their thicknesses are added to each other up to a maximum limit which is greater or less according to the ratio between the height of the strips and the pitch. If, for example, the ratio is 10:1 on a board having strips applied to one side thereof, the total thickness of the aggregate will, at the top edge of the bottom strip, reach 10 times the actual thickness of the strips, and 20 times this thickness if the board is provided with strips on both sides. This substantial difference caused by overlapping, between the thickness of each strip and the overall thickness of the board or panel thus arranged, especially if provided with strips on both sides, in practice militates against any vertical weld intended, for example, to seal the edges or against subdividing the boards or panels thus produced.

Another disadvantage of this known method moreover resides in a disproportionately high consumption of material.

Objects of the present invention include:

(1) An arrangement whereby all the overlapping strips or slips may be welded in a single operation, notwithstanding their number and irrespective of whether one or both faces of the bearing panel or sheet is to have strips applied thereto.

(2) An arrangement whereby the strips are positioned in such manner that, after overlapping and welding, the overall maximum thickness is substantially smaller than that of the panels or boards at present known.

(3) An arrangement whereby the strips are provided with a form such as to effect considerable reduction in the consumption of raw material.

According to the invention there is provided a filing device for documents such as punched cards, of the kind in which partially overlapping horizontal slips are unattached at their upper edge and are fastened by their lower edge to a bearing plate or sheet to form vertically offset pockets, wherein the strips comprise apertures through which welding prongs may be inserted to reach the strip to be welded thereby, in a manner such that each weld is applied to a single strip only irrespective of the number of overlapping strips.

The invention also contemplates a method of making the filing or sorting panel or board.

In order that the invention may be clearly understood a preferred embodiment thereof will now be described, by way of example, with reference to the accompanying drawings, in which:

FIGURE 1 illustrates two strips after being punched out and before being separated, FIGURE 2 shows a single strip according to the invention, FIGURE 3 shows three strips according to FIGURE 3, placed in partially overlapping relation and welded or bonded on a base, to form a vertical file, FIGURE 4 is an illustration, to a reduced scale, of a mounting board before the strips are placed in position thereon, FIGURE 5 is a section on line V—V, FIGURE 4, FIGURE 6 illustrates, to a reduced scale, the working surface of a welding electrode employed in carrying the invention into effect, FIGURE 7 shows a filing or sorting strip according to FIGURE 1, with a card or file placed in position in the pocket formed thereby, and FIGURE 8 illustrates cards or sheets of different size or format filed in pockets of corresponding size formed by one and the same strip.

Referring to the drawings, an appropriate tool, which may be flat or circular, is used simultaneously to form two strips marked 2 and 3, FIGURE 1, from a rectilinear web 1, preferably made of a synthetic material which is translucent, semipliable and weldable, these strips intermeshing by virtue of the fact that each one has one saw-toothed edge having teeth 4 and one rectilinear edge 5.

As can be seen from FIGURE 2, the strips thus cut out each have a tab 6 pierced by a hole 7 at each of their extremities. The holes 7 are arranged to ensure correct positioning of the strips prior to their assembly by means of welding, by employing a mounting plate 8 illustrated in FIGURE 4. The mounting plate 8 bears two vertical rows of pegs or studs 9 to engage in the holes 7 of the strips, in order to locate the strips in appropriate postions.

The two vertical rows of studs 9 are spaced to correspond to the distance separating the two holes 7 of each strip. In each of the rows, the studs 9 are separated by a distance equal to the "pitch" distance of the filing or sorting panel or board, that is to say to the vertical offset or distance between the overlapping strips, FIG. 3.

It will be understood that, if desired, other equivalent devices could be employed instead of the holes 7 and studs 9, in order to hold the strips in correct position prior to being welded.

Each tooth 4 is provided with an aperture or window 10 which preferably has the shape shown in the drawings, the essential condition being that the height $h$, FIG. 3, of material remaining between the aperture and the apex of each tooth, as well as between the aperture and the rectilinear edge 5 of the strip, should be less than the "pitch" of the filing or sorting panel or board (see FIGURE 3).

In the case of filing boards only one face of which is provided with strips or slips as described above, the panel or sheet 11 will initially be positioned on the mounting board 8. The panel or sheet which may, for example, be made of weldable rigid or pliable synthetic material, has its lateral edges positioned between the two rows of studs on pegs 9, as shown in dash-dotted lines in FIGURE 4. The slips will then be located over and about the studs consecutively, in the correct overlapping arrangement, and then welded as will be described below.

If it is intended to manufacture filing boards both sides of which are provded with slips or filing pockets, the strips to be applied to one face of a panel 11 will first be positioned over and about the studs 9, the bearing panel or sheet 11 will then be placed on top of the said strips, and finally the corresponding strips to be applied to the other face of the panel wll be placed in position over and about the studs, prior to the welding operation.

The welding operation is performed by the electrode illustrated in FIGURE 6. This electrode is formed by a plate the dimensions of which correspond to those of the filing board which is to be produced, and comprises, in known manner, a peripheral shearing rim 12. The electrode plate carries rows of welding prongs 13 and the spacing between the rows of prongs 13 corresponds to that which separates the teeth 4 formed in the strips. The distance which separates the prongs 13 in each row corresponds to the "pitch" distance of the filing board, or panel.

FIGURE 3, which for clarity shows only a single line of spot welds 14 obtained by means of the prongs 13, clearly shows that the prongs act only on the apex of each tooth. The upper rectilinear edge 5 of each strip remaining loose, that is, unsecured to the panel 11, and thus forms a pocket in each strip which receives the cards or sheets, as shown at 20, 21 and 22 in FIGURES 7 and 8. The height $h$ is chosen in such manner that each prong 13 may reach the lower extremity of the corresponding tooth 4 after traversing the apertures 10 of all the strips overlapping the strip to be welded thereby, irrespective of the number of the strips, this condition being fulfilled by the height $h$ being less by a suitable amount than the "pitch" or offset distance of the assembled slips. Each prong 13 thus welds one strip only.

At the same time as the spot welds 14 are produced by the prongs 13, the peripheral shearing rim 12 of the electrode produces the lateral welding seams 15, FIG. 3, of the board or panel, by means of which the bearing sheet or panel 11 is assembled to all the strips it bears. The marginal portions of the filing or sorting board or panel thus formed, exceed the size required and which comprise the tabs 6 with their holes 7, are severed at the same time for removal.

It will be noted that the V-shaped form imparted to the teeth 4 as well as to their apertures 10, has the result of reducing the thicknesses of overlap as far as possible in the finished filing or sorting board or panel, the quantity of material forming each strip thus being reduced to a minimum.

Experience has shown that sufficient strength is obtained by the horizontal line of spot welds 14 which secure each strip to its bearing board or panel by the apexes of the teeth formed in the said strip.

The filing boards or panels may be manufactured in any size, and may be of multiple length, to be cut to the desired size or width, as shown in FIGURE 3 by the shearing line 16. This shearing line, as well as the marginal shearing line 15, is always applicable to two thicknesses only, due to the arrangement of the strips on the panel.

FIGURE 7 illustrates a card 20 occupying the full width of the filing panel, this card being slipped under the upper rectilinear edge 5 of the strip and arrested at the bottom by the row of spot welds 14.

FIGURE 8 illustrates another filing panel in which the pockets formed in the strips are of different widths in order to receive cards 21, 22 of different sizes, the width of the pockets being determined by the welding seams 23, 24, which in their turn are always applicable to two thicknesses only of the material.

It will be understood that the height of the strips or slips 2, the form of their teeth and of the apertures provided therein, the degree of their overlap, the number of pockets formed by the intermediate welding seams, the thickness and the nature of the synthetic material from which the strips, as well as their bearing panel are made, may vary according to requirements. The strips may be opaque, transparent, or translucent, and may be coloured according to various systems, to differentiate between the rows of pockets they form, and they may be provided with marks, numerals, letters or legends.

The filing panel according to the invention may be single-sided or double-sided and may be rigid or pliable, for example to form a mural panel or board or, if desired, the pages of a filing book or album.

In the foregoing the invention has been described in reference to a few illustrative devices or systems. It will be evident, however, that variations and modifications, as well as the substitution of equivalent devices or elements for those shown and described herein for illustration, may be made in accordance with the broader purview and spirit of the invention as set forth in the appended claims. The specification and drawings are accordingly to be regarded in an illustrative rather than in a restrictive sense.

What I claim is:

1. In a filing device as claimed in claim 3, said slips having a rectilinear upper edge and a toothed lower edge, to provide a plurality of depending triangular teeth, and the securing of the slips to said panel being effected at the apices of said teeth.

2. In a filing device as claimed in claim 3, each of the lateral extremities of said slips having a projecting tab pierced by a hole, the arrangement being such that the slips may be placed in mutually stepped position in a mounting plate having two vertical rows of pegs of mutual spacing equal to said pitch distance.

3. A device for filing cards, sheets and the like objects comprising in combination:

(1) a supporting panel, (2) a plurality of superposed and stepped slips overlying said panel with the upper edges of the adjacent slips spaced by a predetermined pitch distance, (3) said slips being provided with a plurality of parallel oblong vertical apertures with corresponding apertures being aligned in the superposed position of the slips, (4) the short edges of said apertures being spaced from the adjacent horizontal edges of the slips by distances less than said pitch distance, whereby to provide horizontal rows of freely accessible areas adjoining the lower edges of each slip and being in direct contact with said panel, and (5) means securing said slips to said panels at said areas and along the vertical edges thereof, to form a plurality of stepped pockets by said panel and said slips.

4. In a filing device as claimed in claim 3, said last means including a pair of linear connections securing all said slips to said panel and disposed each closely adjoining and parallel to one of the vertical edges of said slips.

5. In a filing device as claimed in claim 3, said panel and slips consisting of thermoplastic material and said last means being comprised of spot welds at said areas, and a pair of linear welds connecting all said slips to said panel and disposed each closely adjoining to and parallel to one of the vertical edges of said slips.

References Cited

UNITED STATES PATENTS

| | | | |
|---|---|---|---|
| 1,988,368 | 1/1935 | Ainsworth | 129—20 |
| 2,429,349 | 10/1947 | Evans | 211—10 |
| 2,738,075 | 3/1956 | Guignard et al. | 211—56 |
| 3,280,820 | 10/1966 | Miller | 129—20 |

FOREIGN PATENTS

| | | |
|---|---|---|
| 555,477 | 1/1957 | Italy. |
| 235,166 | 3/1945 | Switzerland. |

ROY D. FRAZIER, *Primary Examiner.*

J. FRANKLIN FOSS, *Assistant Examiner.*

U.S. Cl. X.R.

129—20